Albert L. Robbins
Horace F. McKinley
INVENTORS

BY Arnold, Roylance,
Kruger & Durkee
ATTORNEYS

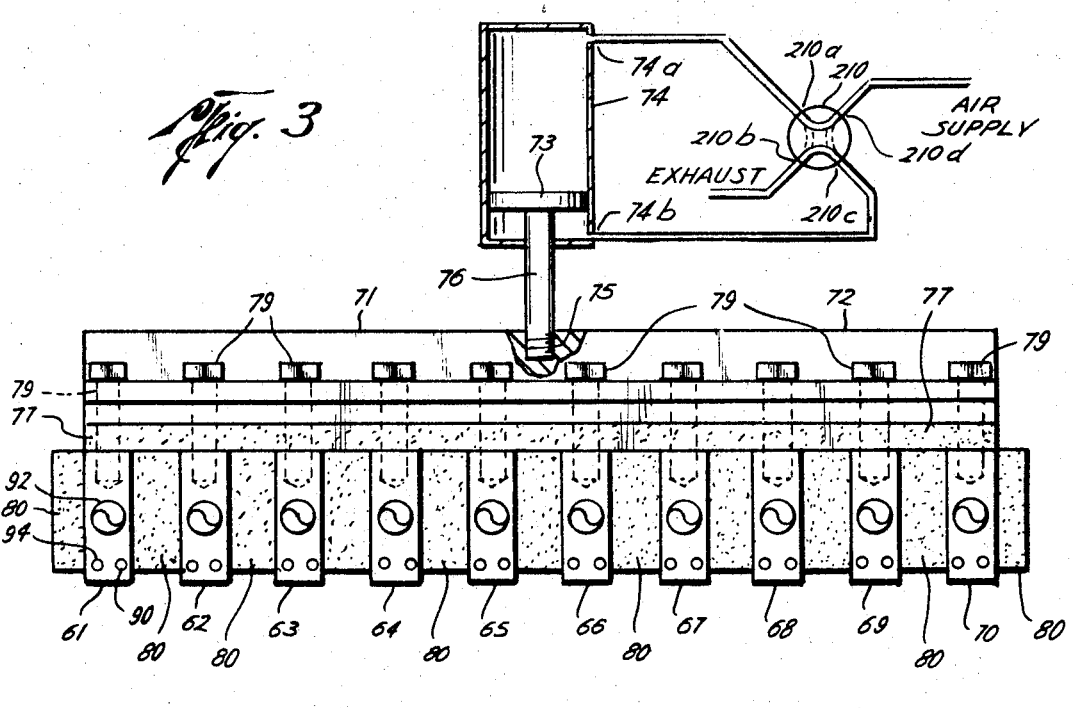
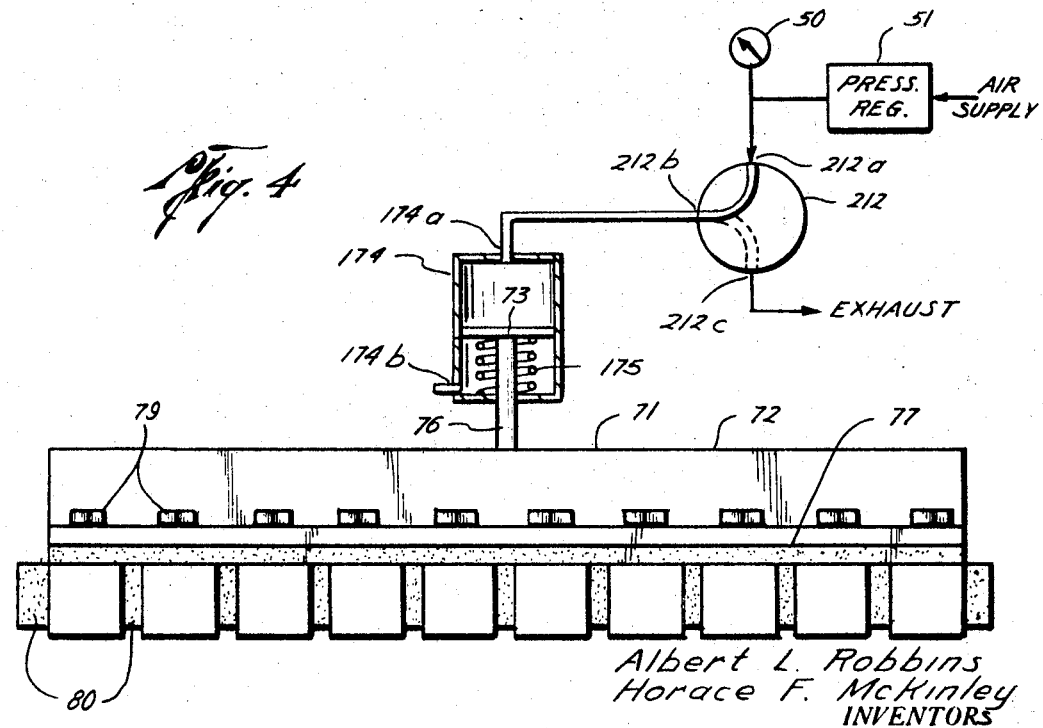

Albert L. Robbins
Horace F. McKinley
INVENTORS

BY Arnold, Roylance,
Kruger & Durkee
ATTORNEYS

# United States Patent Office 3,444,732
Patented May 20, 1969

3,444,732
METHOD AND APPARATUS FOR DETERMINING OPTIMUM BONDING PARAMETERS FOR THERMOPLASTIC MATERIAL
Albert L. Robbins, Rte. 2, Box 573, Alvin, Tex. 77511, and Horace F. McKinley, Houston, Tex.; said McKinley assignor to said Robbins
Filed June 6, 1967, Ser. No. 643,989
Int. Cl. G01b *19/08*
U.S. Cl. 73—150                                    19 Claims

ABSTRACT OF THE DISCLOSURE

A testing device is provided having a linear array of selectively differently heated welding members for pressing against one or more sheets of plastic material at a preselected pressure and time for bonding the material together under preselected different bonding parameters, by which the optimum bonding parameters may be empirically determined.

Background of invention

This invention relates to methods and apparatus for bonding together sheets of plastic and other material by the application of heat and pressure, and more particularly relates to methods and apparatus for determining the optimum temperature, pressure and bonding time for bonding together two or more sheets of material having undetermined physical and chemical characteristics.

It is well known to produce low cost packages and containers by bonding or "welding" together two or more sheets of thermoplastic material such as cellophane, rubber hydrochloride, polyethylene resin, vinylidene chloride, and the like. It is also well known to fabricate such articles at a very low unit cost by employing fully automated "mass production" techniques. It will be apparent, therefore, that the production system which handles and bonds the input material must be preset within relatively close tolerances to apply precisely the optimum amount of heat and pressure for precisely the optimum time interval, during the bonding operation, in order to avoid the waste of producing a large quantity of improperly or inadequately sealed packages or articles.

Although manufacturers of the bulk sheet material take great pains to maintain quality control, it is nevertheless a fact that there will often be differences in the physical and chemical characteristics between two different "batches" of sheet material. These differences are not readily apparent to visual observation, and are usually discovered only after a substantial number of defective or substandard items have been produced. Since the optimum pressure, temperature, and bonding time must be empirically determined for each new batch of material, this usually requires many resettings and readjustments in the production machinery before these optimum operating parameters can be determined, and thus a considerable amount of material is often wasted during the process of finding these optimum parameters.

The problem of resetting the "production line" is further complicated by the fact that each of the three parameters, (i.e., temperature, pressure, and welding time) is a function of the other two parameters. In other words, the greater the temperature employed (within practical limits, of course), the shorter the time necessary to achieve adequate bonding. Since it is desired that the production line be adjusted to achieve a maximum rate of production, it will be apparent that it is not necessary to determine merely the optimum bonding temperature and pressure to achieve adequate bonding. It is also necessary to determine the temperature and pressure which will effectively weld the sheets together during the shortest practical time.

The only technique presently available for determining the optimum bonding parameters for sheets of material of undetermined character, is the simple technique of continuously readjusting the operating parameters of the production system until such optimums have been found. Although the time required to determine these optimums may be minimized by skill and experience, it is nevertheless the case that the introduction of every new batch of material usually requires a complete resetting of the production line. Thus, it is often that it takes longer to determine the proper operating parameters than it does to produce the fabricated items.

These disadvantages of the prior art are overcome with the present invention, and novel methods and apparatus are provided herein for more easily and precisely determining the optimum bonding temperature, pressure, and welding time, for any one or more sheets of material of undetermined characteristics.

Summary of invention

In the preferred embodiment of the invention, a device is provided which contains ten individually and separately heated bonding members (hereinafter referred to as "weld bars") which are arranged in a row. Apparatus is included for adjusting the temperatures of each weld bar so as to provide a weld profile insofar as temperature is concerned, and indicators are also provided for monitoring the temperature of each bar so as to ascertain that the bar has been heated to the exact temperature selected.

A pneumatically operated actuating mechanism is provided for driving the bars as a unit against the material at a preselected pressure, and for a preselected welding time. Thereafter, each area of bar contact on the sheets may be inspected for adequacy of bonding. Since only a small sample of the material need be tested in this manner, and since each test provides a weld using a different temperature, the test may easily be repeated several times in a very short interval using not only different temperature settings but also different pressures and weld time intervals for the similar temperature profiles.

There is one particular problem with thermoplastic bonding which should be especially noted. Since the optimum temperature must be determined within very close tolerances, and since the welding members in the production equipment are electrically heated, it is necessary to supply a very stable preselected current and voltage to the heating elements. Ordinary "house current" is not usually that stable, and thus the production machinery usually includes either its own power supply of special design, or else it usually includes elaborate and expensive rectification and stabilization circuits which it is not practical to include in a compact and portable test device of the character hereinafter described. Accordingly, a special stabilization circuit containing a thermistor is preferably included with the heating circuitry in each weld bar which is responsive to the heat of that weld bar for stabilizing the current and voltage input to heating element within very close tolerances. Therefore, the device hereinafter described may be energized by any conventional power supply.

The features and advantages of the present invention will be apparent from the following detailed description, wherein reference is made to the figures in the accompanying drawings.

The drawings

FIGURE 3 is a more detailed representation, partly pictorial and partly functional, of some of the apparatus depicted generally in FIGURES 1 and 2.

FIGURE 4 is a functional representation of an alternative form of the apparatus depicted in FIGURE 3.

*Detailed description*

Figure 1:
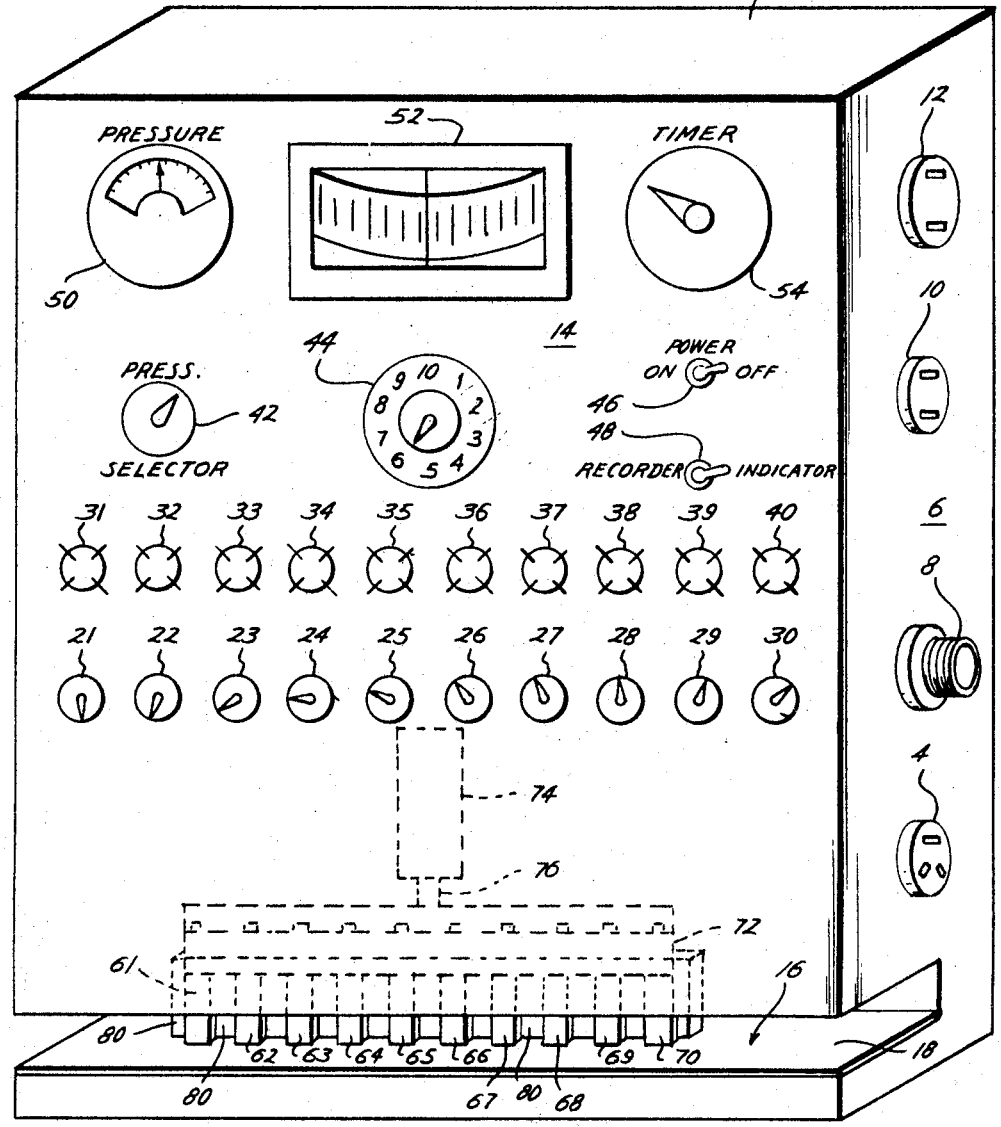
FIGURE 1 is a pictorial representation of one exemplary form of a preferred embodiment of the present invention, wherein is depicted each of the controls for selecting and monitoring various bonding temperatures, pressures, and weld intervals.

Referring now to FIGURE 1, there may be seen a pictorial representation of an exemplary embodiment of an apparatus for determining the optimum pressure, time and temperature for welding together two or more sheets of material having undetermined physical and chemical characteristics. In particular, there is depicted an upright rectangular case 2 having a power input jack 4 preferably located on one side 6 by which power such as 110–120 volts, 60 cycle AC, may be introduced to its internal circuits and components. An air connector 8, a foot switch jack 10, and a recorder jack 12, may also be mounted on the side 6 panel of the case 2 for reasons which will hereinafter be apparent.

The front or instrument panel 14 of the case 2 may be seen to have mounted thereon a plurality of controls and indicators, including ten weld bar temperature control knobs 21–30, which will hereinafter be individually referred to as the "No. 1 temperature control" 21, "No. 2 temperature control" 22, etc., as they appear from left to right of the viewer. Immediately above each such knob is an indicator light 31–40 which will hereinafter be individually referred to as the "No. 1 temperature light" 31, the "No. 2 temperature light" 32, etc., as they appear from left to right of the viewer.

Above the temperature lights 31–41, there may be seen a variable pressure control 42, a temperature monitor switcha 44, a power on-off switch 46, and a temperature indicator-recorder selector switch 48. Also located on the instrument panel 14 are the pressure gauge 50, the temperature indicator 52, and the timer control 54.

As may be seen in FIGURE 1, the apparatus is provided with a recess or "slot" 16 into which sheets of material may be inserted as will hereinafter be explained. The lower surface of the slot 16 is preferably covered with a pad 18 of relatively soft material such as felt or rubber. As may also be seen, there is preferably included an array of ten spaced-apart, hollow metal blocks called "weld bars" 61–70, which project below the upper edge of the slot 16, and which will hereinafter be individually referred to as the "No. 1 weld bar" 61, the "No. 2 weld bar" 62, etc., as they appear from left to right of the viewer. The weld bars 61–70 are preferably each of the same size and shape, with substantially smooth flat lower surfaces confronting the pad 18, and are each rigidly coupled to a horizontal T-bar 72 which, in turn, is connected to a vertically mounted pneumatic cylinder and piston 74 and 76. As may be seen in FIGURE 1, the T-bar 72, pneumatic cylinder 74, piston 76, and all but the lower ends of the weld bars 61–70, are concealed behind the instrument panel 14.

In addition, there is preferably inserted between each of the weld bars 61–70 an insulating pad or block 80 of asbestos or like material. A block 80 is also preferably located on the outer or exposed sides of the No. 1 weld bar 61 and the No. 10 weld bar 70.

The apparatus depicted in FIGURE 1 may be assumed to include certain components of conventional design which are not specifically illustrated in the drawings. For example, the power input socket or jack 4 is intended to accommodate a conventional grounded 3-prong plug which may be connected to any suitable power supply such as common "house" current (60 cycle, 110–120 volts), and thus the apparatus depicted in FIGURE 1 may be assumed to include such a plug and power supply. In addition, the air connector 8 is preferably threaded for convenient interconnection with an air hose (not depicted) which, in turn, is connected to any suitable supply of compressed air (also not depicted).

For reasons which will hereafter be apparent, it is convenient that the apparatus depicted in FIGURE 1 be actuatable by means of a foot switch (not depicted). Thus, the foot switch will be interconnected by means of a cable and plug (also not depicted) with the foot switch receptacle or jack 10 mounted on the side panel 6 as hereinbefore mentioned. In addition, it may be desired to make a permanent record of the temperatures of each of the weld bars 61–70 during tests, and thus a conventional chart recorder (not depicted) may be interconnected with the depicted apparatus by means of a cable and plug (also not depicted) for connection with the recorder receptacle or jack 12.

During operation of the depicted apparatus, two or more sheets of the material to be tested may be inserted into the slot 16 beneath the weld bars 61–70. The power on-off switch 46 will, of course, be positioned to "on" to energize the depicted apparatus, and the recorder-indicator switch 48 may be positioned at "indicator," if the temperatures of the weld bars 61–70 are intended to be visually observed but not recorded, or at "recorder" if a permanent record of these temperatures is sought to be obtained. For purposes of this explanation, however, it will hereinafter be assumed that the switch 48 is positioned at "indicator" as illustrated in FIGURE 1.

It is desired that the sheets of material be welded together at various temperatures, pressures, and welding times, so that the optimum temperature, pressure, and welding time may be determined for the material sought to be tested. Accordingly, each of the temperature control knobs 21–30 is preferably adjusted to establish a different temperature in each of the ten weld bars 61–70. Thereafter, however, it is desirable to monitor the temperature of each of the weld bars 61–70, beginning with the No. 1 weld bar 61, to ascertain that each of the weld bars 61–70 is actually heated to the temperature selected for it. This is accomplished by selectively turning the temperature monitor switch 44 throughout its ten positions, and reading the temperature of each of the corresponding weld bars 61–70 on the temperature indicator 52, or on the recorder (not depicted), as will hereinafter be explained in detail.

It will be noted that each of the temperature indicator lights 31–40 will tend to glow intensely after each resetting of the temperature control knobs 21–30 corresponding thereto. When the corresponding weld bars 61–70 become stabilized at the selected temperatures, however, each of the lights 31–40 should then glow at the same constant intensity to indicate such stabilization. Accordingly, if any weld bar does not stabilize, this will be apparent from the fact that its corresponding temperature indicator light will glow at a different intensity from that of the other lights.

As hereinbefore stated, it is also sought to determine the optimum welding pressure and time, as well as the optimum temperature. Accordingly, the welding pressure may be selected by adjustment of the pressure control 42, and the welding time may be selected by adjustment of the time control 54 as desired.

The apparatus is thus set for testing the material which is inserted in the slot 16. When the foot switch (not depicted) is depressed or closed, air pressure will actuate the pneumatic cylinder 74 and piston 76 to urge the weld bars 61–70 down against the sheets of material in the slot 16, at pressure determined by the setting of the pressure control 42, and during a time interval determined by the setting of the timer control 54. After the expiration of the selected time interval, the piston 76 will move back into the pneumatic cylinder 74 in a manner which will hereinafter be explained, and the weld bars 61–70 will be drawn upwards in the slot 16 off of the material to be tested.

As hereinbefore stated, the bottom surface of the slot 16 is preferably covered by a soft pad 18. It is the purpose of the pad 18 to cushion the material to keep it from being crushed by the weld bars 61–70, and also to insulate the weld bars 61–70 from the metal case 2 to prevent any heat loss.

After the material has been withdrawn from the slot, it may be seen to be welded more or less effectively together in the places wherein contact was had by the weld bars 61–70. It may be that the temperature of at least one of the weld bars 61–70 was adequate to achieve an effective weld, but that the pressure was insufficient. Thus, the pressure of the downward thrust of the weld bars 61–70 may be changed by resetting the pressure control 42, and the test may be repeated.

In addition, it should be realized that the automated production machinery or system is preferably set to operate as fast as possible, and thus it is usually sought to determine the minimum time interval necessary to achieve a proper weld. Accordingly, the test may be repeated with different time intervals as well as different pressures and temperatures, since the optimum temperature, pressure and time interval required to achieve a satisfactory weld is usually arrived at empirically.

Figure 2:
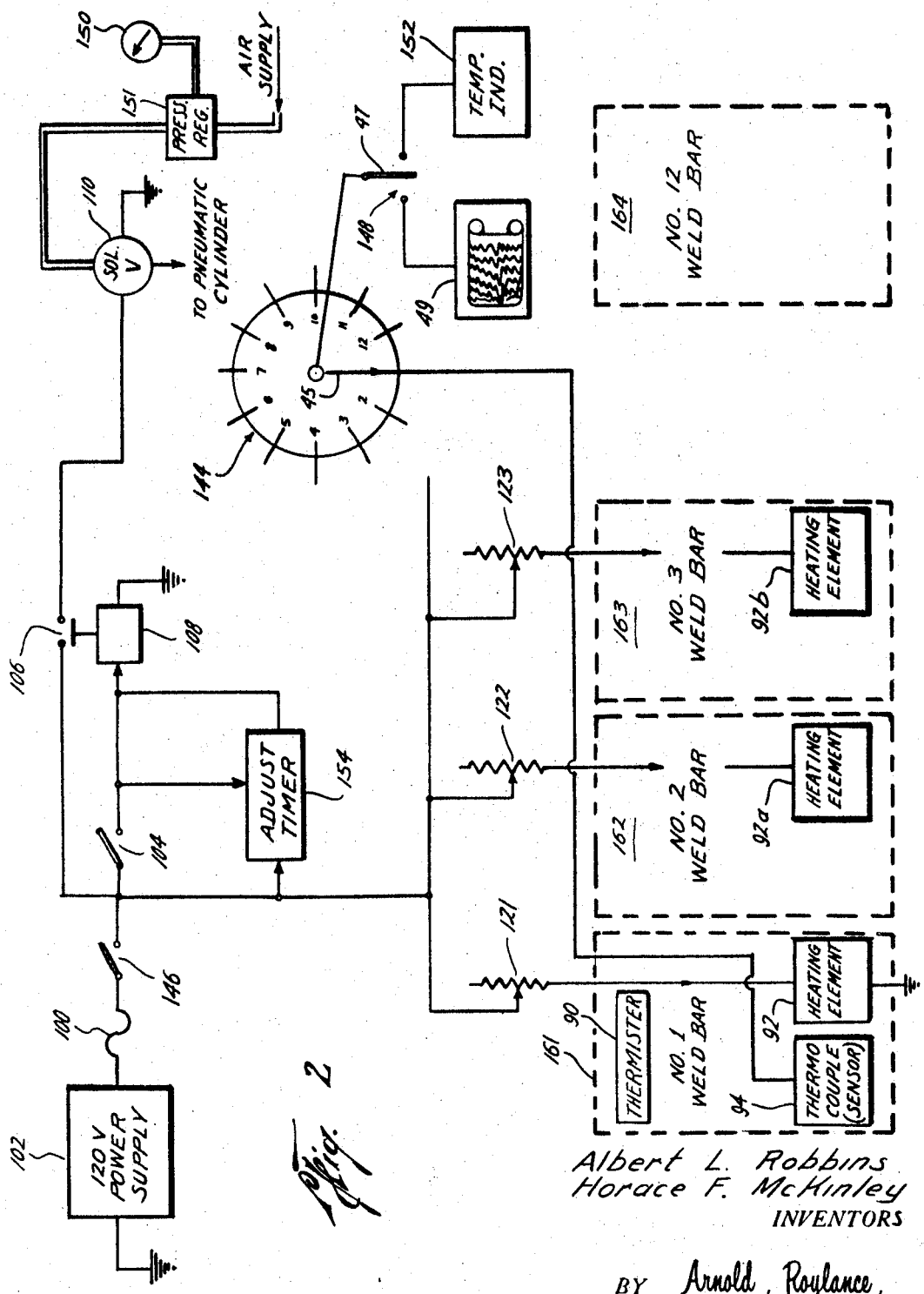
FIGURE 2 is a schematic representation of a portion of one exemplary embodiment of the operating circuitry which may be incorporated with the apparatus depicted in FIGURE 1.

Referring now to FIGURE 2, there may be seen a schematic representation of a portion of the circuitry contained in another form of the apparatus illustrated pictorially in FIGURE 1. In particular, there may be seen a power on-off switch 146 which corresponds functionally to switch 46 illustrated in FIGURE 1 and a conventional fuse 100 which function to connect power from any suitable power supply 102 through a conventional foot switch 104, to one of the two input contacts of a suitable timer 154, and to the contacts of a relay 106 which may be spring-loaded so as to be normally open. It will be noted that the actuating coil 108 of the relay 106 is connected between ground or reference potential, and the foot switch 104 and the output contact of the timer 154. Accordingly, it will be seen that when the foot switch 104 (which may also be spring-loaded so as to be normally open) is depressed and closed, power from the power supply 102 is connected through the actuating coil 108 of the relay 106 which, in turn, closes its contacts to connect power through the solenoid valve 110 which is interconnected between the air supply (not depicted), a suitable variable pressure regulator 151 (controlled by the pressure control 42 depicted in FIGURE 1) a suitable pressure gauge 150, and a suitable pneumatic cylinder 74 (these components corresponding to regulator 51, control 42, gauge 50, and cylinder 74 depicted in FIGURE 1). Since the foot switch 104 is spring-loaded, it will connect power to the coil 108 only as long as it is closed, and thus the timer 154 (which is also preferably normally open), responds to the momentary input of power from the foot switch 104 to close for a preselected time interval determined by the setting of the time control 144, to also connect power through the coil 108 to maintain the relay 106 closed during the preselected time interval. After expiration of the time interval, the timer 154 will open automatically to de-energize the coil 108, and the relay 106 will then return to its normally open condition. Thus, the solenoid valve 110 will return to its de-energized condition, and the weld bars will be drawn upwards, as will hereinafter be explained.

Each of the weld bars, which are suggested in FIGURE 2 by heavy dashed lines 161–164, may contain a thermistor 90, a suitable heating element 92 for heating the weld bar to the temperature desired, and a temperature sensor which may be a conventional thermocouple 94. Although these three components are specifically illustrated only in the rectangular dashed line 161 representing the No. 1 weld bar, it should be understood that each of the other weld bars may contain similar components performing a similar function. Thus, No. 2 weld bar which is represented in FIGURE 2 by dashed line 162 contains a heating element 92A, No. 3 weld bar represented by dashed line 163 contains heating element 92B, etc.

As further illustrated, each heating element is connected through a separate potentiometer to the power on-off switch 146. Thus, heating element 92 may be controlled by potentiometer 121 which is adjusted by any suitable means such as the knob depicted in FIGURE 1 as the No. 1 temperature control 21, heating element 92 is controlled by potentiometer 122 which, in turn, is controlled by a suitable component such as the No. 2 temperature control 22, etc.

It is the function of the thermocouple 94 to provide a signal indicative of the temperature of the No. 1 weld bar 161, and thus it is connected to its corresponding contact in the temperature monitor switch 144. Although not specifically illustrated in FIGURE 2, it should be understood that each of the other eleven contacts in the temperature monitor switch 144 are similarly connected to corresponding sensors or thermocouples in the other eleven weld bars suggested in FIGURE 2. The contact arm 45 of the temperature monitor switch 144 is connected to the contact arm 47 of the temperature indicator-recorder selector switch 148 which, in turn, has its two contacts connected, respectively, to the chart recorder 49 hereinbefore mentioned but not depicted, and to the temperature indicator 152 illustrated pictorially as indicator 52 in FIGURE 1.

Referring now to FIGURE 3, there may be seen a more detailed representation of the T-bar 72 and weld bars 61–70, and an exemplary form of the pneumatic actuating system hereinbefore represented functionally in FIGURES 1–2. Accordingly, it may be seen that the T-bar 72 is disposed in an inverted manner with the free traveling end 75 of the piston 76 threadedly inserted in the middle of the upwardly extending shank 71 of the T-bar 72. The piston head 73 is slidably disposed in the pneumatic cylinder 74, which is preferably of conventional design and thus may include conventional components, such as throttling valves and accumulators (not depicted) for preventing the piston 76 from moving too abruptly in and out of the cylinder 74.

As may also been seen, the cylinder 74 is provided with an upper port 74A and a lower port 74B, both of which are preferably located at opposite ends of the cylinder, and both of which are, respectively, connected to two ports 210A and 210C of the valve portion 210 of the solenoid control valve 110 depicted in FIGURE 2. Ports 210B and 210D, in the valve 210, may be seen to be connected to an exhaust line and to the air supply, respectively.

FIGURE 3 may be seen to illustrate the condition of the depicted pneumatic actuating system existing after the foot switch 104 has been depressed, and existing during the actuation of the timer 154. In this condition, the valve 210 is positioned so as to connect air pressure through ports 210A and 210D into the upper portion of the cylinder 74 through port 74A. Thus, pressure on the top of the piston head 73 tends to drive the piston 76 downward in the cylinder 74, and air trapped below the piston head 73 is driven out through ports 74B, and through ports 210B and 210C, to the exhaust line. In this manner, the weld bars 61–70 are forced down against the sheets of material lying on the pad 18 depicted in FIGURE 1.

After the timer 154 returns to its normally open condition, and power is thereby disconnected from the coil 108 of the relay 106, the solenoid control valve 110 depicted in FIGURE 2 will return to its normally "closed" position. In this case, the valve 210 depicted in FIGURE 3 will change its position so that the air supply will be interconnected through ports 210C and 210D to port 74B, in the cylinder 74, and port 74A in the cylinder 74 will be interconnected with the exhaust line through ports 210A and 210B in the valve 210, as suggested by the dotted lines in valve 210. Although valve 210 is suggested in FIGURE 3 as being designed to rotate between its two conditions or positions, it should be clearly understood that the valve 210 depicted in FIGURE 3 is exemplary only, and that any suitable valve design may be used for purposes of the present invention.

As may be seen in FIGURE 3, each of the ten weld bars 61-70 is substantially completely insulated from the others. Thus, insulating blocks 80 of asbestos or the like are preferably inserted between each of the weld bars 61-70, and adjacent the outside faces of the end weld bars 61 and 70, to substantially isolate each of the weld bars 61-70 as hereinbefore mentioned with respect to FIGURE 1. In addition, however, it is especially desirable to avoid heat loss from any of the weld bars 61-70 to or through the T-bar 72. Hence, it is desirable to dispose a rectangular block 77 of similar insulation material between the bottom of the T-bar 72 and the tops of the weld bars 61-70.

Each of the weld bars 61-70 may be fastened to the bottom of the T-bar 72 by two bolts (only one visible in FIGURE 3) 79 extending through the T-bar 72, one in front and one in back of the T-bar shank 71, and through the insulating block 77, into threaded engagement in the top portion of each of the weld bars 61-70. To keep the weld bars 61-70 insulated, one from another, the bolts 79 may be formed of a non-metallic substance such as polytetrafluoroethylene resin which has a low heat conductivity. Alternatively, non-metallic inserts (not depicted) having a low heat conductivity and internal threads may be disposed in the weld bars 61-70 to receive the threaded ends of the bolts 79 if the bolts 79 are made of a metallic substance having a relatively high heat conductivity.

Referring now to FIGURE 4, there may be seen an alternative embodiment of the pneumatic actuation system depicted in FIGURES 2 and 3, wherein the pneumatic cylinder 174 contains a coil spring 175 between the bottom end of the chamber of the cylinder 174 and the underneath side of the piston head 73. The valve 212 is provided with only three ports 212A-C.

As illustrated in FIGURE 4, the system is depicted in the condition it tends to assume after the foot switch 104 (FIGURE 2) is closed, and the timer 154 has been actuated. Thus, the valve 212 is positioned so that the upper portion of the cylinder 174 receives air pressure through valve ports 212A and 212B, and through cylinder port 174A, to drive down the piston 74 to thereby compress the spring 175. The lower cylinder port 174B functions to vent the air below the piston head 73 which would otherwise be trapped in the cylinder 174.

When the timer 154 returns to its normally open condition, the valve 212 will also return to its "normal" condition as suggested by the dotted lines in the valve 212. Thus, the air supply will be cut off from entering the cylinder 174, and the compressed air in the top portion of the cylinder 174 will be vented to the exhaust line when the spring 175 pushes the piston head 73 and piston 76 back up in the cylinder 174.

Figure 5:
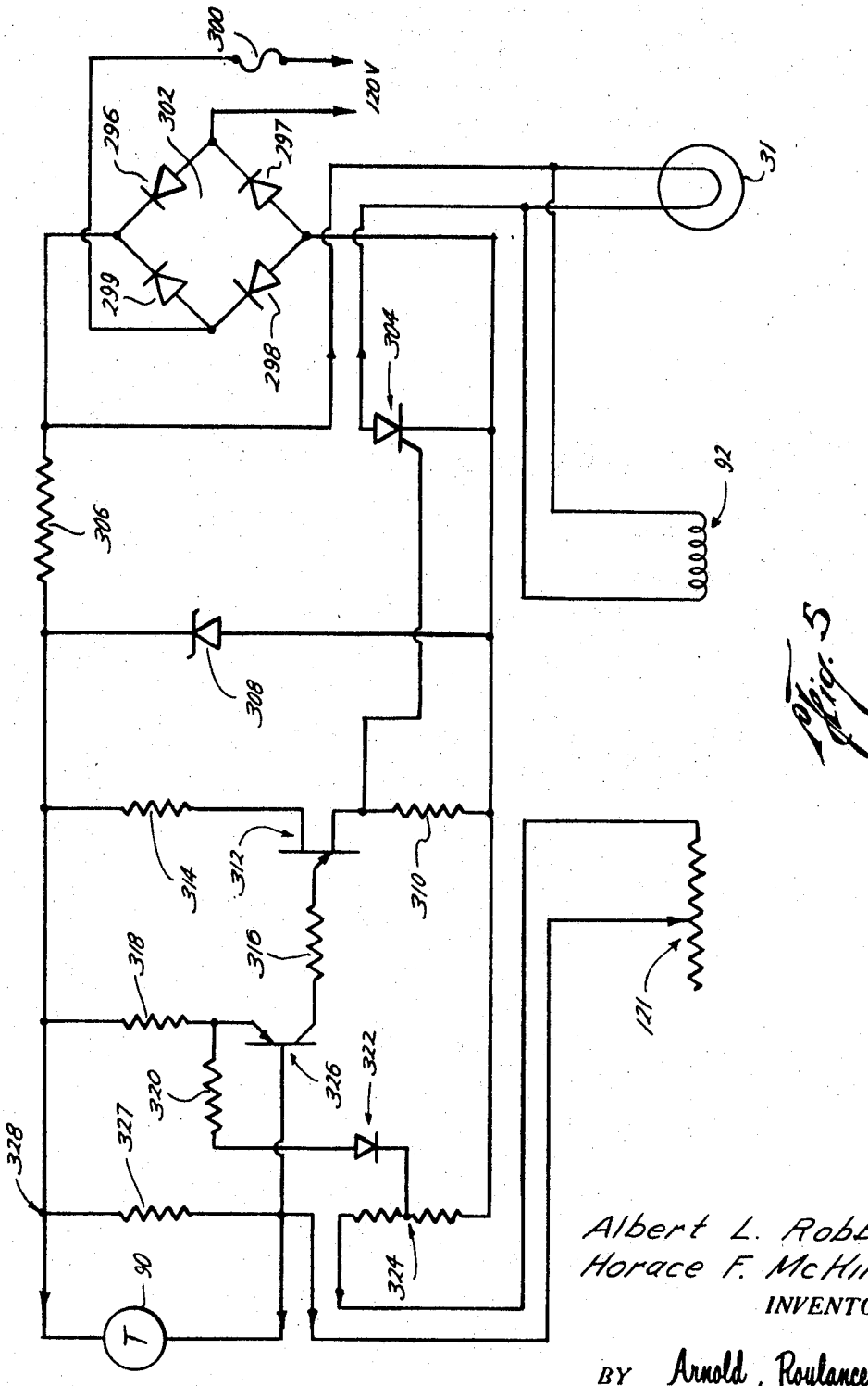
FIGURE 5 is a schematic representation of one exemplary embodiment of a stabilization circuitry suitable for stabilizing the temperature of a heated welding member.

Referring now to FIGURE 5, there may be seen a schematic representation of an exemplary form of circuitry for maintaining the weld bars 61-70 at a stable temperature. As hereinbefore stated, it is intended that the preferred forms of the structures illustrated herein be capable of using conventional power supplies such as "house current," but it is nevertheless a fact that the current and voltage supplied by power sources of this character are relatively unstable insofar as present purposes are concerned. Since it is intended to determine the optimum welding temperature within relatively close tolerances, it is desirable to incorporate a stabilizing circuit of the character depicted in FIGURE 5, in the heating circuitry of each of the weld bars 61-70 as will hereinafter be described.

FIGURE 5 shows an exemplary stabilizing circuitry for use in or with the heating circuitry for weld bar 61. However, such a circuit may be assumed to be included in or with the heating circuitry for each of the other weld bars 62-70.

In particular, there may be seen depicted the potentiometer 121, the heating element 92, the No. 1 temperature light 31, and the thermistor 90, which are depicted in FIGURES 1 and 2. In addition, there is provided a fuse 300 in the 120 volt, AC input circuit which is connected through a bridge circuit 302 composed of four diodes 296-299 arranged in a conventional manner, to the No. 1 indicator light 31 and the heating element 92. The bridge circuit 302, together with a silicon control rectifier 304, may be seen to provide full wave rectification of the AC power passing to the No. 1 indicator light 31 and heating element 92 which are connected between one leg of the bridge circuit 302 and emitter of the rectifier 304. A first resistor 306 may be seen interconnected between one leg of the bridge circuit 302 and a Zener diode 308 which is interconnected with the rectifier 304. A second resistor 314 may be seen interconnected between the junction of the first resistor 306 and the Zener diode 308, and a unijunction transistor 312 having its emitter connected through a third resistor 316 to a PNP transistor 326 which, in turn, has its emitter connected through a fourth resistor 318 to the junction between the first and second resistors 306 and 314. The emitter of the transistor 326 may also be seen to be interconnected through a fifth resistor 320 and a diode 322 to a center tap on a sixth resistor 324 which, in turn, is connected at one end to the low voltage end of the potentiometer 121, and at its other end to the unijunction transistor 312 by way of a seventh resistor 310, and to the Zener diode 308, the rectifier 304, and to one leg of the bridge circuit 302. The wiper contact of the potentiometer 121 may be seen to be connected through an eighth resistor 327 to the junction between the second and fourth resistors 314 and 318, and also to one end of the thermistor 90 which, in turn, is connected at its other end to the junction between the wiper arm of the potentiometer 121, the eighth resistor 327, and the transistor 326.

As will be apparent to those skilled in this art, the load current passing through the heating element 92 is proportional to the amount of resistance turned into the circuit by the potentiometer 121, and thus is controlled by the magnitude of the current passing through the silicon control rectifier 304. However, the setting of the potentiometer determines the amount of current flowing through the rcetifier 304 only within certain limits which are too broad for present purposes. Thus, the thermistor 90 and the other components hereinbefore described are provided for the purpose of counterbalancing fluctuations and variations in the amount of heat output from the heating element 92 which would otherwise be unavoidable notwithstanding the amount of resistance which has been turned in by a particular setting of the potentiometer 121.

It should be noted that the setting of the potentiometer 121 also determines the magnitude of the voltage drop between junction 328 and the center tap on resistor 324, and that this voltage acts to "lock in" the voltage at the emitter of the PNP transistor 326. However, the amount of resistance turned in by the potentiometer 121 determines the magnitude of the voltage at the base electrode of the PNP transistor 326 which conducts only when its base electrode is "more negative" than its emitter, and in an amount which is proportional to the amount of the voltage drop across the emitter and base electrodes of the transistor 327.

The thermistor 90, which is responsive to the temperature of the No. 1 weld bar 61, provides a resistance which decreases in proportion to any increase in the temperature of the No. 1 weld bar 61, and vice versa. Thus, the thermistor 90 tends to reduce the amount of negative charge on the base electrode of the PNP transistor 326 as the temperature of the No. 1 weld bar 61 decreases, and this tends to correct any fluctuations in the temperature of the No. 1 weld bar 61. However, it should be understood that the voltage drop across the thermistor 90 is determined in the first instance by the setting of the potentiometer 121, and thus all changes in this voltage drop will occur only within upper and lower limits which are determined in the first instance by the setting of the potentiometer 121. Accordingly, the thermistor 90 does not act independently of the potentiometer 121, but instead acts merely to stabilize the voltage across the transistor 326 within those limits which are determined by the setting of the potentiometer 121.

Although the foregoing description has been directed to sealing or bonding together two or more sheets of thermoplastic material, it should be understood that there are often instances where it is desirable to bond a plastic sheet to a sheet of paper or some other material which is nonplastic in character, and that the techniques and apparatus disclosed and described herein are equally useful for this purpose. Moreover, it is not essential to the broadest applications of the present invention that the material to be tested be in the form of sheets, if it is desired that the bonding parameters of the material be determined and thus it is within the scope of the invention to modify the techniques and structures disclosed herein to accommodate samples which have any predetermined geometrical configuration.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

What is claimed is:

1. Apparatus for determining optimum bonding parameters for bonding together two samples of material having undetermined characteristics, said apparatus comprising
    a plurality of movable bonding members,
    variable heating means for selectively and separately heating said bonding members,
    a stationary support member for supporting said samples of material against pressure by said bonding members,
    actuating means for urging said bonding members simultaneously against said samples of material and said support member at a preselected pressure for a preselected time interval, and
    monitoring means for indicating the magnitude of said time interval and pressure and the temperature of each of said bonding members.

2. The apparatus described in claim 1, including
    heating control means for selecting the temperature of each of said heated bonding members,
    pressure control means for selecting the pressure at which said bonding members are urged against said material, and
    time control means for selecting the time interval during which said bonding members are urged against said material.

3. The apparatus described in claim 2, wherein said variable heating means is adapted to selectively and independently heat each bonding member at a different preselected temperature.

4. The apparatus described in claim 3 including temperature-responsive means for separately stabilizing the temperature of each of said bonding members.

5. The apparatus described in claim 4, wherein said variable heating means further includes
    sensing means interconnected with said bonding members.

6. The apparatus described in claim 5, wherein said apparatus further includes
    a corresponding plurality of illuminated temperature indicating means each interconnected with one of said heating means for indicating the relative stability of the temperature of the corresponding one of said bonding members.

7. The apparatus described in claim 6, wherein said stationary support member includes a yielding pressure-exerting portion disposed for supporting said samples of material in overlapping relationship against said bonding members.

8. Apparatus for determining the optimum bonding parameters for bonding together two sheets of material having undetermined characteristics, said apparatus comprising
    a stationary base member,
    a yielding pressure-exerting member disposed on said base member for supporting said sheets in overlapping relationship,
    a plurality of movable bonding members disposed in linear array and spaced a common distance from said base member and said yielding member,
    insulating means disposed adjacent and between each of said bonding members,
    a plurality of variable heating means each disposed in one of said bonding members,
    monitor means for selectively and separately indicating the temperature of each of said bonding means,
    means for selectively and separately controlling each of said heating means,
    temperature stabilizing means interconnected with each of said plurality of heating means and responsive to the temperature of the bonding member heated by such heating means,
    urging means for urging said bonding members as a unit simultaneously against said material and said yielding member on said base member at a preselected pressure and during a preselected time interval,
    pressure control means for selectively varying and indicating the pressure at which said bonding members are simultaneously each urged against said material and yielding member on said base member,
    time control means for selectively varying and indicating the time interval during which said bonding members are simultaneously each urged against said material and yielding member on said base member, and
    foot switch for coupling power to said urging means.

9. A method for determining the optimum bonding parameters for bonding together two pieces of material having undetermined characteristics, said method comprising
    disposing first samples of bondable material together in an overlapping relationship,
    applying a first compressional force to said overlapping first samples simultaneously at a plurality of separate locations during a first preselected time interval while heating said first samples a first plurality of different temperatures at each of said locations,
    indicating the magnitudes of said time interval and each of said different temperatures, and
    comparing the adequacy of the bond between said first samples at each of said locations.

10. The method as described in claim 9, including the steps of
    disposing second samples of bondable material together in an overlapping relationship,
    applying a second different compressional force to said overlapping second samples simultaneously at a similar plurality of separate locations during a second different preselected time interval equal in duration to said first interval while heating said second samples a second plurality of different temperatures substantially the same as said first temperatures at said locations, indicating the magnitudes of said first and second compressional forces during said first and second time intervals respectively, and comparing the adequacy of the bond between said second samples with the bond between said first samples at each of said locations.

11. The method as described in claim 9, including the steps of disposing second samples of bondable material together in an overlapping relationship, applying a second compressional force substantially equal to said first force to said second samples simultaneously at a similiar plurality of separate locations during a second preselected time interval different from said first time interval while heating said second samples a second plurality of different temperatures substantially the same as corresponding ones of said first temperatures at said locations, correlatively indicating the magnitudes of each of said temperatures, forces, and time intervals, and comparing the adequacy of the bond between said second samples with the bond between said first samples at each of said locations.

12. The method as described in claim 9, including the steps of disposing second samples of bondable material together in an overlapping relationship, applying a second compressional force substantially equal to said first force to said second samples simultaneously at a similar plurality of locations during a second preselected time interval substantially equal to said first time interval while heating said second samples a second plurality of different temperatures different from corresponding ones of the temperatures at which said first samples are heated at corresponding ones of said locations, correlatively indicating magnitudes of each of said temperatures, forces, and time intervals, and comparing the adequacy of the bond between said second samples with the bond between said first samples at each of said locations.

13. Apparatus for determining optimum bonding parameters for bondable material, comprising a plurality of spaced-apart bonding members, heating means for heating selected ones of said bonding members at different preselected temperatures, driving means for urging said bonding members against a sample of said material simultaneously at a corresponding plurality of locations during a preselected time interval and at a preselected pressure, and monitoring means for selectively deriving indications of the magnitude of said temperatures at corresponding ones of said plurality of locations during said time interval.

14. The apparatus described in claim 13, wherein said monitoring means includes timing means for selecting and indicating the magnitude of said preselected time interval.

15. The apparatus described in claim 14, wherein said monitoring means further includes pressure selection means for selecting and indicating the magnitude of the congressional force with which said bonding members are urged against said material by said driving means.

16. The apparatus described in claim 15, wherein said monitoring means further includes temperature selection means for selecting and indicating the magniture of the temperature of each of said bonding members.

17. The apparatus described in claim 16, wherein said monitoring means further includes a temperature indicator, a plurality of temperature sensors each thermally coupled to a different one of said bonding members, and a selector switch for selectively coupling said sensors to said temperature indicator.

18. The apparatus described in claim 17, wherein said bonding members further include a corresponding plurality of heating elements each disposed in one of said bonding members, and temperature stabilizing means interconnected with said heating elements.

19. The apparatus described in claim 18, wherein said temperature stabilizing means comprises a corresponding plurality of thermistors each interconnected with said temperature selection means and one of said heating elements.

References Cited

UNITED STATES PATENTS

| | | | |
|---|---|---|---|
| 2,688,356 | 9/1954 | Conti | 73—150 XR |
| 2,844,956 | 7/1958 | Smith | 73—150 XR |
| 2,958,366 | 11/1960 | Conti | 73—15 XR |
| 3,357,249 | 12/1967 | Bernous et al. | 73—362 XR |

LOUIS R. PRINCE, Primary Examiner.

J. NOLTON, Assistant Examiner.

U.S. Cl. X.R.

73—15.4; 156—64, 378